United States Patent
Schmitt (10) Patent No.: US 8,155,909 B2
(45) Date of Patent: Apr. 10, 2012

(54) METHOD AND DEVICE FOR CHECKING THE PLAUSIBILITY OF MEASURED VALUES IN A MOTOR VEHICLE ENVIRONMENT

(75) Inventor: Hubert Schmitt, Ochtendung (DE)

(73) Assignee: Lucas Automotive GmbH (DE)

( * ) Notice: Subject to any disclaimer, the term of this patent is extended or adjusted under 35 U.S.C. 154(b) by 457 days.

(21) Appl. No.: 12/373,598

(22) PCT Filed: Jul. 5, 2007

(86) PCT No.: PCT/EP2007/005977
§ 371 (c)(1),
(2), (4) Date: Jan. 13, 2009

(87) PCT Pub. No.: WO2008/006507
PCT Pub. Date: Jan. 17, 2008

(65) Prior Publication Data
US 2010/0023205 A1    Jan. 28, 2010

(30) Foreign Application Priority Data
Jul. 14, 2006    (DE) .................. 10 2006 032 727

(51) Int. Cl.
*G01C 17/38* (2006.01)
*G01M 17/00* (2006.01)

(52) U.S. Cl. ....................................... 702/93; 701/29.1

(58) Field of Classification Search ............ 701/29, 701/33, 34; 702/93
See application file for complete search history.

(56) References Cited

U.S. PATENT DOCUMENTS

| | | | | |
|---|---|---|---|---|
| 4,071,898 A * | 1/1978 | Schorsch et al. | ................ | 701/21 |
| 4,916,612 A * | 4/1990 | Chin et al. | ........................ | 701/3 |
| 4,939,652 A * | 7/1990 | Steiner | ............................ | 701/35 |
| 5,412,570 A * | 5/1995 | Gruler et al. | .................... | 701/35 |
| 5,418,721 A * | 5/1995 | Arai et al. | ........................ | 701/35 |
| 5,544,058 A * | 8/1996 | Demizu et al. | ................... | 701/29 |
| 5,583,772 A * | 12/1996 | Kitano et al. | ................... | 701/71 |
| 5,631,656 A * | 5/1997 | Hartman et al. | .......... | 342/357.32 |
| 5,757,645 A * | 5/1998 | Schneider et al. | .............. | 701/29 |
| 5,848,365 A * | 12/1998 | Coverdill | ........................ | 701/35 |
| 5,968,107 A * | 10/1999 | Vogan et al. | .................. | 701/102 |
| 5,969,599 A * | 10/1999 | Wessels et al. | ............... | 340/436 |
| 5,983,860 A * | 11/1999 | Kitamura et al. | ............. | 123/399 |
| 6,070,120 A | 5/2000 | Sager et al. | | |
| 6,363,308 B1 * | 3/2002 | Caruso et al. | ................... | 701/45 |
| 6,507,198 B1 * | 1/2003 | Streib | ........................... | 324/523 |

(Continued)

FOREIGN PATENT DOCUMENTS

DE    19525217 A1    1/1997
(Continued)

*Primary Examiner* — Darnell Jayne
*Assistant Examiner* — Andrew Roersma
(74) *Attorney, Agent, or Firm* — MacMillan, Sobanski & Todd, LLC (57) ABSTRACT

A method, a device and a computer program product, by means of which sensor values of redundant sensors in vehicles can be compared with each other to carry out a plausibility check, the measured values of said sensors not being synchronized with each other, are described. On the basis of a first measured value in time, and using the physical properties of the vehicle, a plausibility window, in which a second, subsequent measured value of a different sensor must be to count as plausible, is formed. The determined plausibility of the measured values is indicated by means of a plausibility signal.

24 Claims, 4 Drawing Sheets

U.S. PATENT DOCUMENTS

| | | | |
|---|---|---|---|
| 6,625,527 B1 * | 9/2003 | Ding et al. | 701/34 |
| 6,681,912 B2 * | 1/2004 | Suzuki et al. | 192/85.41 |
| 6,704,628 B1 * | 3/2004 | Fennel et al. | 701/29 |
| 6,704,631 B2 * | 3/2004 | Winner et al. | 701/34 |
| 6,843,537 B2 * | 1/2005 | Babala et al. | 303/122.09 |
| 7,062,370 B2 * | 6/2006 | Vhora et al. | 701/100 |
| 7,123,021 B2 | 10/2006 | Przymusinski et al. | |
| 7,197,917 B2 * | 4/2007 | Hasegawa | 73/114.37 |
| 7,359,776 B2 * | 4/2008 | Souda | 701/34 |
| 7,551,997 B2 * | 6/2009 | Inage | 701/41 |
| 2005/0159869 A1 | 7/2005 | Tohdo et al. | |
| 2006/0155426 A1 * | 7/2006 | Steiger | 701/1 |
| 2007/0185664 A1 * | 8/2007 | Tanaka et al. | 702/56 |
| 2008/0228342 A1 * | 9/2008 | Turfkruyer | 701/29 |

FOREIGN PATENT DOCUMENTS

| | | |
|---|---|---|
| DE | 29721751 U1 | 4/1998 |
| DE | 19748596 A1 | 1/1999 |
| DE | 19923688 A1 | 11/2000 |
| DE | 10145485 A1 | 4/2003 |
| DE | 10218645 A1 | 11/2003 |
| DE | 10338234 A1 | 9/2004 |
| EP | 0849109 A2 | 6/1998 |

* cited by examiner

METHOD AND DEVICE FOR CHECKING THE PLAUSIBILITY OF MEASURED VALUES IN A MOTOR VEHICLE ENVIRONMENT

CROSS-REFERENCE TO RELATED APPLICATIONS

This application claims priority to International Patent Application No. PCT/EP2007/005977 filed Jul. 5, 2007, the disclosures of which are incorporated herein by reference in their entirety, and which claimed priority to German Patent Application No. 10 2006 032 727.6 filed Jul. 14, 2006, the disclosures of which are incorporated herein by reference in their entirety.

BACKGROUND OF THE INVENTION

The invention concerns a method of checking the plausibility of measured values. More precisely, the invention concerns a method of checking the plausibility of measured values of the same measured variable, said values being generated by unsynchronised sensors in a motor vehicle environment.

For capturing and processing measured values in safety-relevant systems, sub-tasks are usually achieved with redundancy, to keep the probability of faults and failures of the whole system low. This can include the capture of one and the same measured variable by multiple sensors of the same or different kinds. It is usually assumed that the probability of a defect of a single component is many times greater than a defect of two components which are provided in parallel at the same instant.

For instance, the speed of rotation of a motor vehicle around its vertical axis, the so-called yaw rate, can be captured by two sensors and passed on to a processing unit, which itself is part of a system for automatic steering interventions to stabilise the vehicle. The intervention times of such a steering system are very short, since a wrongly generated steering moment can have a safety-critical effect within a few milliseconds (typically 50-100 ms). In the processing unit, therefore, the malfunction of one of the sensors must be quickly and reliably detected, to be able to switch the automatic steering system off in good time and warn the driver.

It must be taken into account that the measurement times of the sensors are not necessarily synchronised, and therefore comparing the values is not immediately possible. If the measured values are transmitted via a bus with priority arbitration as is usual today, it is also not guaranteed that the measured values reach the processing unit in the sequence in which they were captured.

In the prior art, devices which use the change of measured values over time for fault detection are known. Such a device is described in patent application DE 199 23 688 A1, and corresponding U.S. Pat. No. 6,507,198B1, both of which are incorporated by reference herein. A fault state is assumed if the signal changes of the sensors do not correlate with each other. The described device is not designed to process measured values which refer to different measurement times.

Patent application DE 195 25 217 A1 concerns a method of evaluating safety-critical measured variables using two independent measurement channels, of which one measurement channel captures the whole measurement range, and the other captures only a partial measurement range. However, the described method is also not designed to process measured values which refer to different measurement times.

The invention is therefore based on the object of determining the plausibility of unsynchronised measured values of at least two sensors of the same measured variable in the motor vehicle environment.

BRIEF SUMMARY OF THE INVENTION

According to a first aspect, this object is achieved by assigning a time stamp to each measured value; deriving a plausibility window from the physical properties of the motor vehicle; testing whether a first measured value of a first sensor and a later second measured value of a second sensor differ by more than is specified by the plausibility window; and depending on a result of the test, outputting a plausibility signal.

The time interval between the first measured value and the second measured value can enter the determination of the plausibility window. For instance, in the case of measured values which are far apart in time, the plausibility window can be larger than in the case of measured values which follow each other in quick succession.

The measured variable can be a yaw rate of the motor vehicle. However, the invention is not restricted to this; in principle, with the invention discrete measured values of any kind which are made available continuously by at least two sensors can be checked for plausibility.

For instance, the invention can be used in a system for automatic steering interventions. In this case, a maximum yaw rate, which can be controlled by a steering angle, can be used to determine the plausibility window. Another physical property of the motor vehicle is the maximum physically possible change of the yaw rate within a specified time span, and the plausibility window can be formed on this basis.

The stated test can include the step of forming the absolute difference between the first and second measured values. This difference is then compared with the plausibility window. In another version, first the plausibility window can be determined on the basis of the first measured value in time, and then the position of the second measured value in time in this plausibility window can be tested.

The plausibility window can have an upper and a lower limit, which can be determined independently of each other. The position of the plausibility window relative to the first measured value in time can thus be adapted to circumstances, and if required it can be asymmetrical with reference to the first measured value.

A rate of change of the measured values of the first sensor and/or second sensor can also enter the determination of the plausibility window. By including the change of a measured variable, the plausibility window can be determined in a more targeted way, and thus a more meaningful plausibility signal can be provided.

Information about the operating state of the motor vehicle can also enter the determination of the plausibility window. For instance, at a high vehicle speed the maximum plausible yaw rate can be lower than at a lower vehicle speed.

Histories of the measured values of the first and/or second sensor over a predetermined period can be stored, and the histories too can enter the determination of the plausibility window. If required, an extrapolation of a measured value from a stored history of measured values can be formed to determine the plausibility window. Statistical considerations of stored histories are another possible way of determining the plausibility window.

The measured values of the at least two sensors can be transmitted on a multiplexed bus. This can involve time division multiplexing, for instance.

If one of the measured values is absent for a predetermined period, a fault signal can be output. The fault signal can be used to give a warning to the driver of a motor vehicle. A safety-relevant system which uses the provided plausibility signal can be deactivated, or its functioning can be otherwise modified, by means of the fault signal.

The measurement frequency of the first and/or second sensor can be varied depending on the difference of the measured values of this sensor from at least one reference value. If the measured values of one or more of the sensors differ only slightly from the reference value, for instance the measurement frequency can be reduced, to reduce the computation and communication load of the vehicle systems which are used. One of the measured values can be used as the reference value. However, the reference value can also be predetermined or continuously recalculated.

As well as the plausibility signal, measured values which are determined from the measurements of the sensors, and are proportional to the measured variable, can be output. In one version, a signal which is determined from the redundant measurements of the two sensors is provided. This signal can still be provided even if only one sensor provides measured values.

The frequency of the measurements which enter the plausibility determination can be made dependent on the difference of the measured values of this sensor from the reference values. For instance, for only slight differences of the measured values of a sensor from the reference values, the measurement frequency of this sensor can remain unchanged, whereas some of the measured values do not enter the plausibility determination. This is advantageous if the quantity of relevant information is not or tolerably slightly reduced by the omission, since then a qualitatively comparable determination can be carried out at lower cost.

The measured values of one of the sensors can be used as reference values. Histories of the measured values of at least one of the sensors can be stored, and from these histories the measured value which differs least from the reference values can be determined and output. Forming the mean value of multiple sensor signals would reduce, but not avoid, a possible measurement error of one of the sensors. By outputting the nearest measured value to the reference measurement, this disadvantage is avoided.

As mentioned above, the measured values of one of the sensors can be used as reference values. However, the reference values can also be the result of a different determination. In particular, a different system, which for instance itself may have a number of sensors, can provide the reference values.

According to a further aspect, the above-mentioned object is achieved by a device which includes an input interface for receiving measured values of the at least two sensors, a time stamp being assigned to each measured value. The device also has a processing unit, which is able to test whether a first measured value of a first sensor differs from a second measured value of a second sensor by more than a plausibility window specifies. The plausibility window for this purpose is derived from the physical properties of a motor vehicle. Depending on the result of this test, the processing unit can output a plausibility signal. The device also preferably has an output interface, via which this plausibility signal can be output.

The sensors of which the device uses the measured values can be yaw rate sensors. The sensors can be of the same or different types, and be housed close together or at distant positions of the motor vehicle from each other. An arrangement of the sensors near the geometrical centre of the motor vehicle, parallel to the vertical axis, has been shown to be advantageous.

For each sensor, a memory or memory area can be provided, and measured values of the sensors can be stored in it. In one version, the capacities of these memories can be equal for all sensors. Each memory can be constructed as a cyclic memory, and be written to cyclically.

The device can have a further output interface, via which it can output an output signal which is proportional to the measured variable, and which it determines from the measured values of the sensors.

Both the output signal and the plausibility signal can be transmitted on the same multiplexed bus as the measured values of a sensor. Use of the Control Area Network (CAN) bus standard for this purpose is a possible example.

Multiple sensors can share a multiplexed bus. Further devices can be connected to this bus for transmitting and/or receiving. The bus can be organised serially.

According to a further aspect, the object is achieved by a computer program product for carrying out the described steps, the computer program product running on a processing unit.

Other advantages of this invention will become apparent to those skilled in the art from the following detailed description of the preferred embodiments, when read in light of the accompanying drawings.

DETAILED DESCRIPTION OF THE INVENTION

In the following, embodiments of a method and a device for testing the plausibility of measured values are described. The described device receives measured values and provides a plausibility signal and optionally an output signal. The output signal can also be output instead of the plausibility signal.

By convention, P represents a plausibility window, S represents a sensor, and M represents a measured value. A subscripted index of an identifier indicates the sensor to which the identifier refers. Thus $P_1$ is the plausibility window which has been determined on the basis of the measured value of sensor 1. $S_1$ designates the sensor with number 1, $M_1$ designates the measured value of sensor 1. If lower-case letters (i, j) are used as indices, these designate generally any one of the sensors which are used, i and j representing different numbers.

Figure 1:
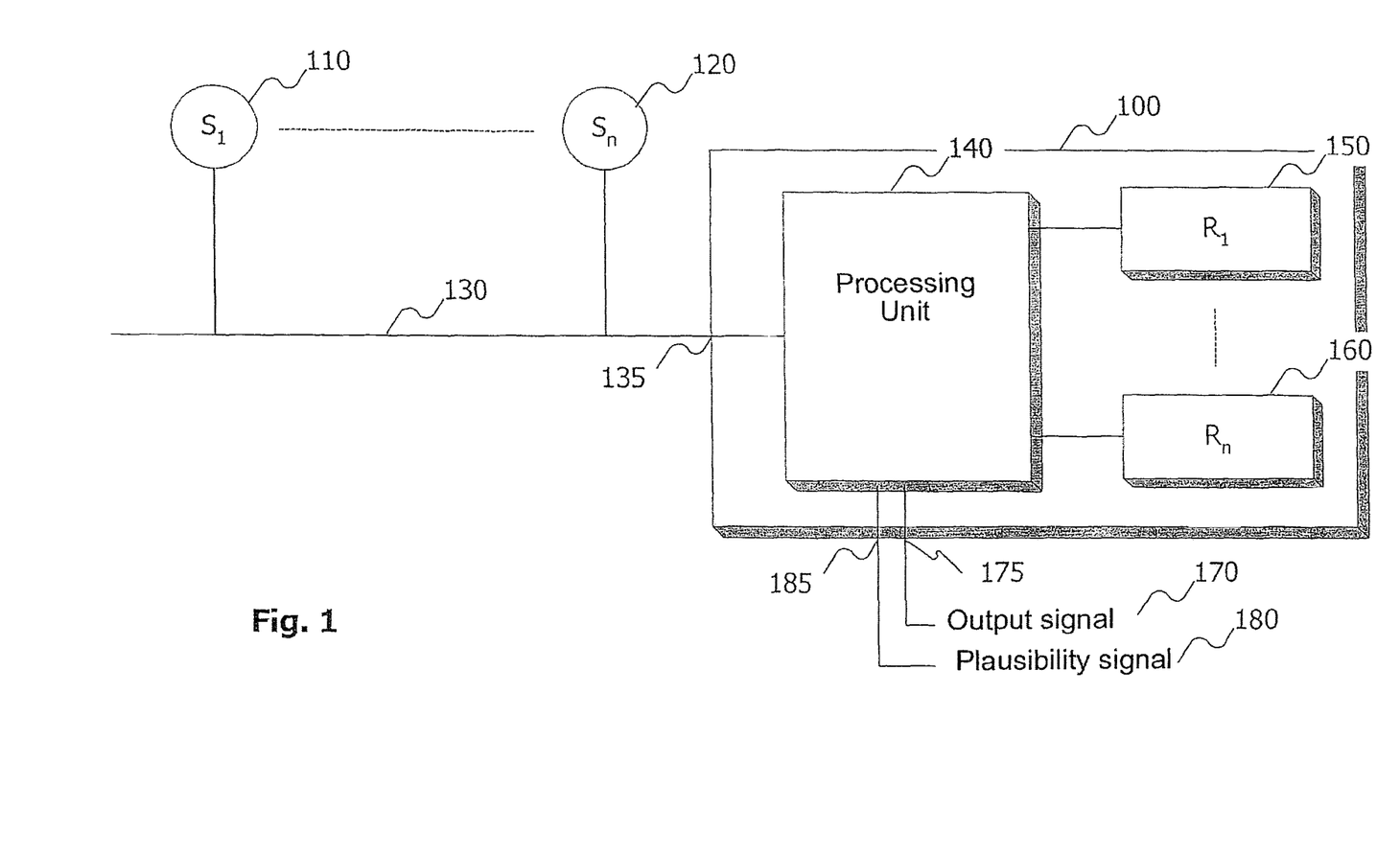
FIG. 1 shows a block diagram of a device according to the invention.

FIG. 1 shows an embodiment of a plausibility device 100 in a block diagram. The sensors $S_1$ 110 to $S_n$ 120 perform measurements of the same physical measured variable. The measured variable can be a movement of a motor vehicle around its vertical axis, the so-called yaw rate. At least the two shown sensors 110 and 120 are used, but any number of further sensors for the same measured variable can be used. The sensors 110 and 120 are not synchronised with each other, and each sensor takes measurements regularly and makes them available via a bus 130. The measurement frequencies (scan rates) of the individual sensors 110, 120 can be equal, but different measurement frequencies can also be used for each sensor or for groups of sensors. The measurement frequencies can also depend on further parameters. These can be local parameters such as the last measured yaw rates of a sensor; additionally or alternatively, parameters which are collected at other locations, e.g. the vehicle speed, can also influence the measurement frequency of each sensor.

The bus 130 transports the signals of each sensor through the vehicle. Preferably, a single bus 130 is used to connect all sensors 110, 120 to each other, and via an input interface 135 to a processing unit 140. However, multiple buses can also be used. In particular, one possibility is that each sensor 110, 120 is connected via its own bus 130 which is assigned to it (like traditional cabling) to the processing unit 140. These can be analogue or digital buses, which for instance work on the time slot method. Any other forms of transmission are also conceivable; for instance, the signals could be transmitted frequency-modulated on a corresponding bus 130. A preferred embodiment provides the use of the CAN bus. CAN buses have been used successfully for years in the motor vehicle environment, for transmitting a wide variety of data.

To differentiate safety-relevant from less safety-relevant systems, increasingly several buses are laid in one vehicle. In the case of multiple available buses, the sensors 110, 120 can be assigned to the same or different buses. Usually, use of the most safety-relevant CAN bus of the vehicle will suggest itself.

The described device 100 can be used on buses which support further communication stations, without affecting its functions. It is only necessary to ensure that measured values from at least two sensors 110, 120 reach the processing unit 140 at a frequency which is still more acceptable. For this purpose, it is advantageous to provide a bus 130 which supports the prioritisation of stations or messages. The circumstance that with prioritisation less highly privileged messages are transmitted only after the more highly privileged messages have been processed is not a restriction for the described method; on the contrary, the method removes this problem, as described below. In particular, the method is able to process measured values which do not reach the processing unit 140 in the same sequence as they were collected by the sensors 110, 120.

Each sensor 110, 120 provides each of its measurements with a unique time stamp. One embodiment provides that each sensor 110, 120 has its own time standard, which at regular intervals or as required is matched to the time standards of the other sensors or to a global time standard. Alternatively, it is possible that in a calibration phase the processing unit 140 determines the absolute offset of the time standards of each sensor. The long-term stability of each time standard of each sensor 110, 120 should then be known, to compensate for the different time standards drifting apart by triggering a calibration phase before a chosen tolerance limit is reached.

A further embodiment provides that each sensor 110, 120, in a calibration phase, compares its local time standard with, and if necessary adjusts it to, a global time standard. The global time standard can be provided by the processing unit 140.

Yet another embodiment provides that only one central time standard is used by every sensor 110, 120. In the case of data collisions on a bus 130, or phases of high loading of the bus 130, this can result in differences between a measurement instant and the actually assigned time stamp, but this can usually be tolerated. Usually, the degree of loading of the bus 130 is low enough, with sufficient reliability, to keep the time differences which may occur negligibly small.

Each sensor 10, 120 can transmit its collected measured values autonomously on the bus 130; transmission and possibly preceding collection of a measured value can also be triggered by a message which is transmitted via the bus 130. If the response time of each sensor 110, 120 is known, or if it can be predetermined, for instance the time stamp can be assigned to the measured value by the component which requested transmission of a measured value. This requesting component can be the processing unit 140.

According to the embodiment shown in FIG. 1, the processing unit 140 has memories $R_1$ 150 to $R_n$ 160, which are each assigned to the sensors $S_1$ 110 to $S_n$ 120. Each of these memories 150 to 160 contains a number of memory locations, each of which can receive a measured value and the associated time stamp. Each memory 150 to 160 preferably has the same number of memory locations, and is written to cyclically. This means that after as many measured values and time stamps as there are memory locations have been stored, the next incoming measured value and time stamp are stored in the memory location which contains the oldest measurement in the memory. The memories 150 to 160 can also be separate memory areas within a single physical or logical memory. The bandwidth with which the processing unit 140 can address the memories 150 to 160 should take account of the measurement frequencies and the number of sensors which are used under the worst conditions to be assumed. Only the limits of the transmission systems which are used between the elements, e.g. a maximum cable length, are set for the geometrical division of the sensors 110, 120, the processing unit 140 and the memories 150 to 160 in the vehicle.

In the embodiment, the processing unit 140 provides an output signal 170, which is proportional to the measured variable which the sensors capture, via the output signal interface 175. Because of the processing and plausibility testing described below, this output signal 170 can contain, with redundancy, the measured values of the sensors which have been recognised to be intact, and is thus suitable as an input variable for safety-relevant processing systems.

From the incoming measured values and the time stamps assigned to them, the processing unit 140 also provides a plausibility signal 180 (e.g. a fault signal, a warning signal or a switching-off signal) outward via a plausibility signal interface 185. This signal can be, for instance, the logical level of a connection; alternatively or additionally, the plausibility signal 180 can be distributed on a bus. Other embodiments for converting, transporting and using a provided plausibility signal 180 are well known to the person skilled in the art. If the plausibility signal 180 is output on a bus, a preferred embodiment provides for using one of the buses 130 via which the sensors 110, 120 are already connected for this purpose. However, depending on the purpose of the signal, other buses, or a bus of a similar type in a different safety engineering area, are possible. The plausibility signal 180 can also be output many times, e.g. by an appropriate message on a CAN bus and by activating a display device, which informs the vehicle driver about a change of the plausibility criterion.

Figure 2:
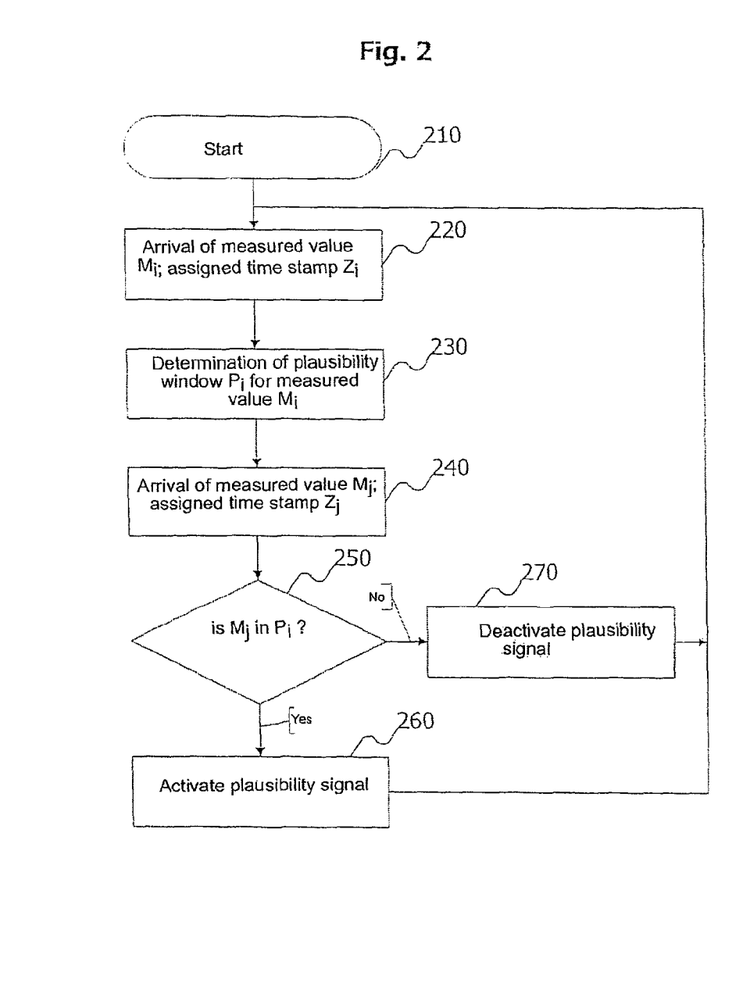
FIG. 2 shows a flowchart of a first embodiment of a method according to the invention.

FIG. 2 shows a flowchart of an embodiment of the method. In Step 210, the method is started. This is usually the case when the electrical loads of a motor vehicle are switched on, even before the engine is started. A calibration phase, which may be required and is explained above, is not carried out in this figure. Depending on the specific implementation and the frequency of such a calibration phase, the person skilled in the art will immediately be able to include such phases in the flowchart.

In Step 220, the measured value $M_i$ and the time stamp $Z_i$ assigned to it arrive from a first sensor. If the processing unit 140 has measured value memories 150 to 160, the incoming measured value $M_i$ and the time stamp $Z_i$ assigned to it are stored in the memory which is assigned to the sensor from which the measured value $M_i$ comes. In Step 230, on the basis of the measured value $M_i$, a plausibility window $P_i$ is determined. Physical properties of the motor vehicle enter this determination.

In Step 240, a measured value $M_j$ arrives from a second sensor, together with the time stamp $Z_j$ assigned to it. If the processing unit 140 has multiple measured value memories 150 to 160, the measured value $M_j$ which has arrived, together with the time stamp $Z_j$ assigned to it, are stored in the memory which is assigned to the sensor from which the measured value $M_j$ comes.

In Step 250, whether the measured value $M_j$ is within the plausibility window $P_i$ is determined. If it is, in Step 260 the plausibility signal 180 is activated. Otherwise, in Step 270, the plausibility signal 180 is deactivated. In both cases, the method returns to the starting point, and waits for a further measured value and time stamp in Step 220.

At every further pass through the method, it is possible to reuse, in Step 220 in the current pass, as measured value $M_i$ and time stamp $Z_i$, the measured value $M_j$ and time stamp $Z_j$ which were obtained in Step 240 in the earlier pass. It should be noted that the measured values $M_i$ and time stamps $Z_i$ in Step 220 come from a different sensor from the measured values $M_j$ and time stamps $Z_j$ in Step 240.

Figure 3:
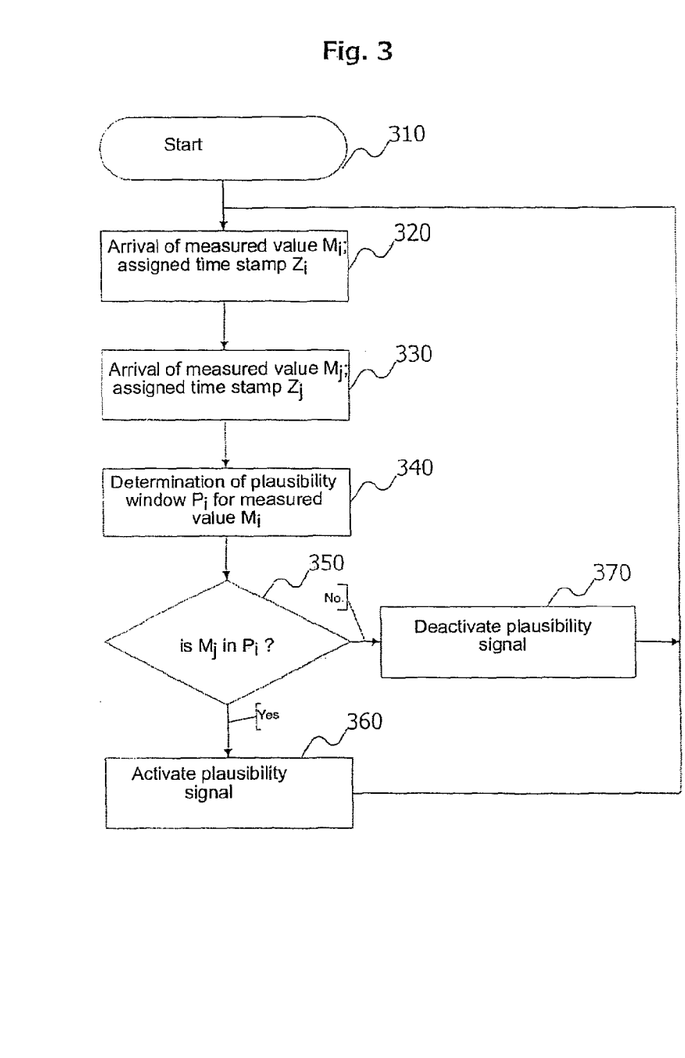
FIG. 3 shows a flowchart of a second embodiment of a method according to the invention.

FIG. 3 shows a variant of the flowchart of FIG. 2. The essential difference is that in FIG. 3, after the arrival of the measured value $M_i$ and the associated time stamp $Z_i$ in Step 320, first the arrival of the measured value $M_j$ and the associated time stamp $Z_j$ in Step 330 follows, before, in Step 340, the plausibility window $P_i$ for the measured value $M_i$ is determined. In this way, the information of the measured value $M_j$ and time stamp $Z_j$ is already present before the plausibility window $P_i$ is formed. It is thus possible to involve both measured values $M_i$, $M_j$ and/or both time stamps $Z_i$, $Z_j$ in the determination of the plausibility window $P_i$, or to form the difference of the measured values $M_i$, $M_j$ and compare it with a plausibility window, which may for instance be permanently specified (read out) or variable (calculated).

In the case of this variant too, it is possible, after a first pass of Steps 320 to 350 and 360 or 370, in Step 320, for the measured value $M_i$ and time stamp $Z_i$, to use the measured value $M_j$ and time stamp $Z_j$ of Step 330 from the previous pass. The restriction that the measured values and time stamps in Steps 320 and 330 must not come from the same sensor remains.

Figure 4A:
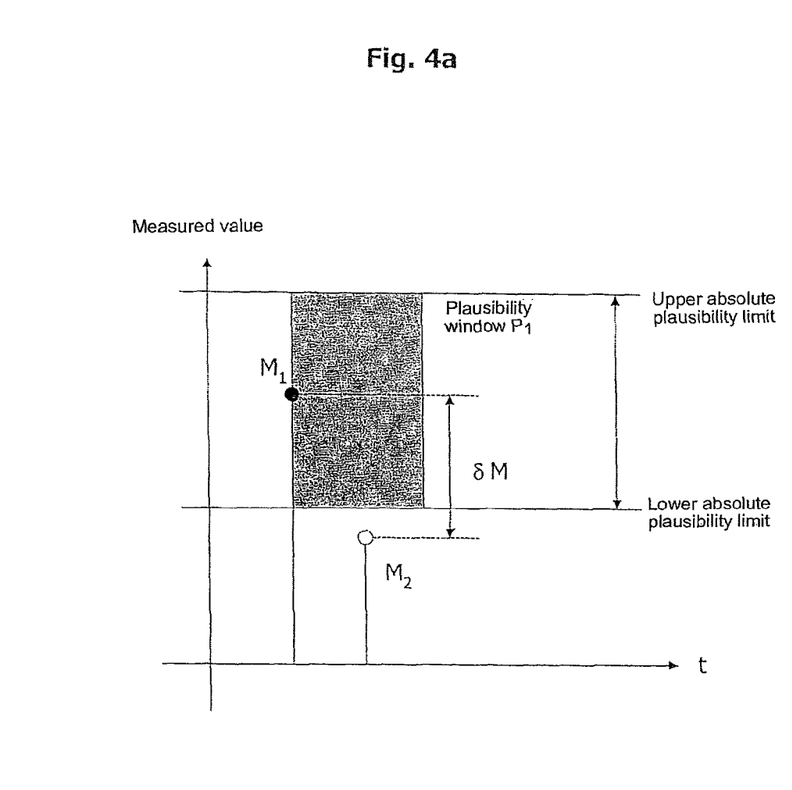
FIG. 4a shows a representation of the temporal succession of two measured values of two sensors.

FIG. 4a shows a diagram of possible relationships of two measured values of different sensors in their course over time. Passing time is shown on the abscissa, from left to right; the ordinate shows the absolute amount of a measured value. Measured value $M_1$ of a first sensor is the first in time to be collected; it is followed by measured value $M_2$ of a second sensor. The rectangle with the grey background identifies the plausibility window $P_1$. The index of the plausibility window indicates which measured value of which sensor the window refers to. A measured value which follows it in time, and the plausibility of which is tested, must come from a different sensor here.

The determination of a plausibility window $P_1$ for measured value $M_1$ can involve, for instance, the shown absolute plausibility limits. As shown, the plausibility window $P_1$ can be formed on the basis of this upper and this lower limit only. In the case of a measured yaw rate, the absolute plausibility limits represent the maximum and minimum plausible values of a vehicle rotational speed around the vertical axis. For instance, it must be assumed that if the plausibility signal is used for a system for stabilising the driving state (AFS: Active Front Steering) by means of automatic steering angles, a yaw rate of several hundred degrees per second is either based on a measurement or processing error, or the yaw rate is actually so high, and a stabilisation attempt by steering angle is futile. In both cases, deactivation of the AFS system is indicated, and can be caused by evaluating the deactivated plausibility signal. Other variables which can enter the determination of a plausibility window include the vehicle speed and the steering angle. For instance, if it is known that the vehicle is moving forwards, and if the steering angle does not equal zero, a minimum plausible yaw rate value can be determined, and undershooting it indicates a measurement or processing error or insufficient ground adhesion of at least some wheels.

Figure 4B:
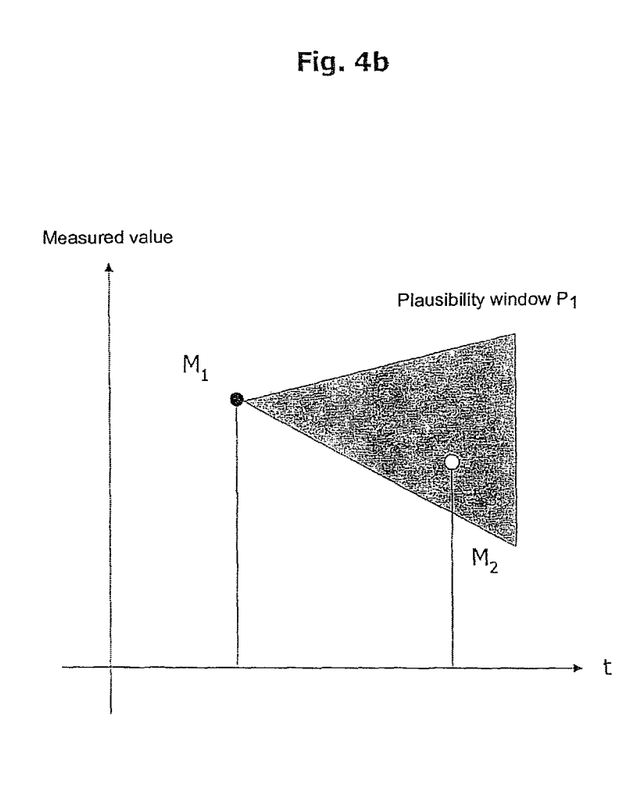
FIG. 4b shows a representation of a plausibility window in relation to two measured values of two sensors.

FIG. 4b shows further variations of the determination of a plausibility window in a co-ordinate system corresponding to FIG. 4a. Here too, measured value $M_1$ (first sensor) is collected before measured value $M_2$ (second sensor). As indicated by the triangle with the grey background, a plausibility window which depends on the time difference of the two measured values from each other can be formed. Accordingly, measured values which follow closely after each other are allowed to differ only slightly to be recognised as plausible. If the values are further apart in time, the plausibility window at this point is larger, and larger differences between the absolute measured values still count as plausible. This heuristic is created a priori, on the basis of the physical vehicle properties.

The absolute difference between the two represented measured values can also influence the plausibility window. For instance, as indicated by the triangle with the grey background, a tolerated change in the direction of a greater measured value can be recognised as plausible to a lesser extent than a deviation in the direction of a smaller measured value $M_2$. For the symmetrical case, in which the tolerated deviation of the measured value $M_2$ from the measured value $M_1$ in the positive direction is as great as in the negative direction, the following general expression is possible:

$$P_{1max} - P_{1min} \geq |M_1 - M_2|;$$

where $P_{1max}$ and $P_{1min}$ designate the upper and the lower limit of the plausibility window which was determined on the basis of the first value in time of the sensor 1. In the general case, if the tolerated thresholds in the positive and negative directions are independent of each other, the following representation applies:

$$M_1 - P_{1min} \leq M_2 \leq M_1 + P_{1max}.$$

If the measured values $M_1$ and $M_2$ are collected at the same instant, or if the time difference between them is negligibly small, the absolute measured values can be compared directly with each other. According to the problem which is set for this invention, this is a special case, which does not restrict the generality of the unsynchronised measured values. In the ideal case, the collection of the measurements of the various sensors is evenly distributed over time, and they arrive with tolerable delay at the processing unit 140, so that no relatively long time sections for which no current measured values are present in the processing unit 140 occur.

Figure 5:
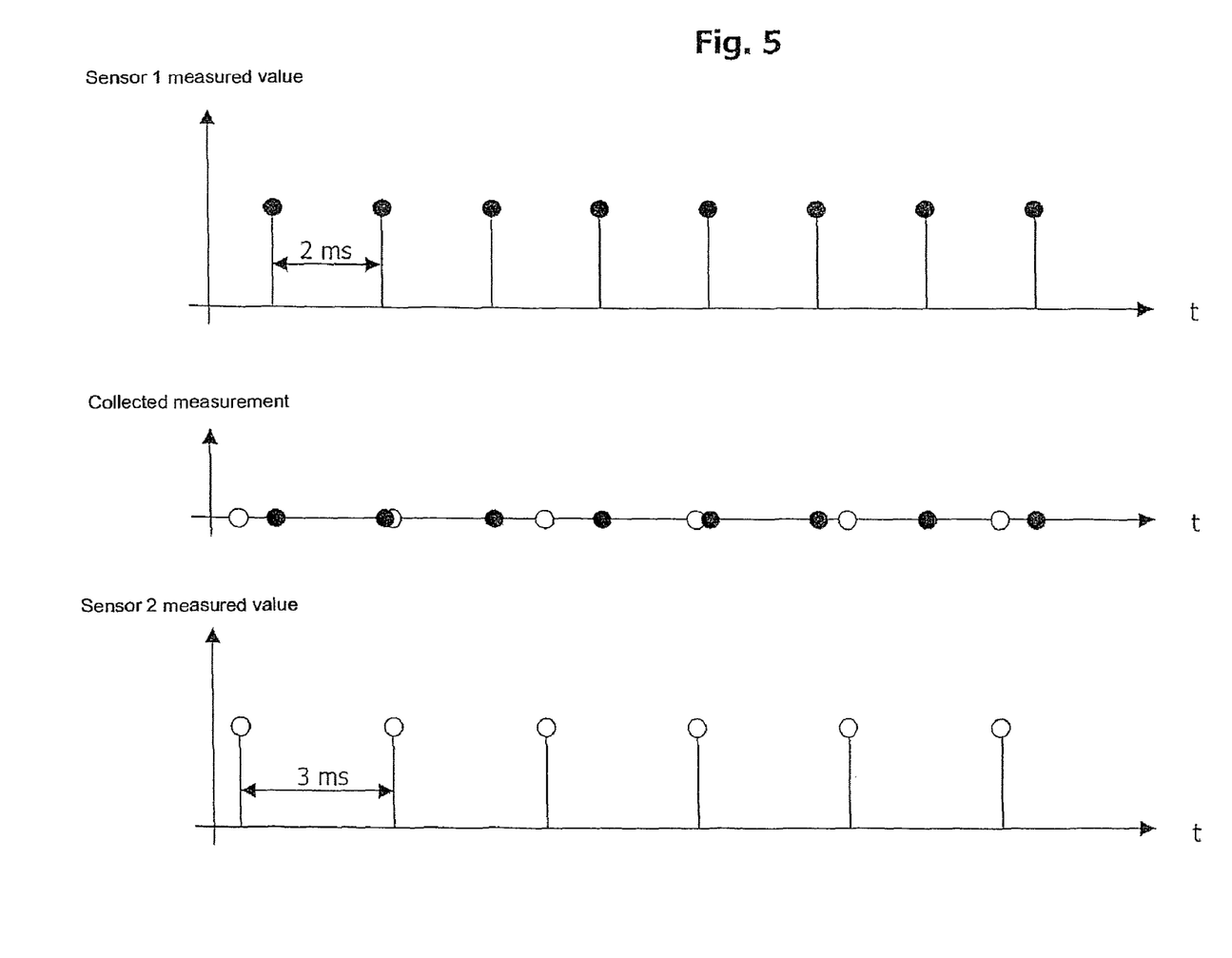
FIG. 5 shows a representation of the temporal succession of messages of two sensors arriving at the processing unit.

FIG. 5 shows a course over time of messages of two sensors arriving at the processing unit 140. At the top of FIG. 5, the measurements of a sensor 1 are shown, only the measurement times, not the measured values, being relevant here. At the bottom of FIG. 5, in a corresponding representation, the measurements of a sensor 2 are shown. Every 2 ms, sensor 1 supplies a measured value, whereas sensor 2 provides a measured value only every 3 ms. Even the first measurements of the two sensors are offset relative to each other by an amount which corresponds to neither of the two measurement intervals. These are relatively prime, so that the sensors never both supply a measured value at the same instant.

On the middle time axis, the times of the incoming measured values of the two sensors are shown overlaid. The measured values coming from sensor 1 are shown as black-filled circles, and those from sensor 2 are shown as white-filled circles. It becomes clear in the middle diagram how different the gaps between the incoming measurements are. Since the measured values of the sensors always have different measurement times, there is practically never direct comparability of the sensor values. The described method compensates for this problem by forming plausibility windows, and ensures a plausibility check on measured values which are decorrelated in time.

If a previously defined time span in which no measurement signal arrives at the processing unit 140 occurs, the processing unit 140 can output a fault signal. Similarly, the processing unit 140 can establish and indicate a fault state of a single sensor 110, 120 if this sensor 110, 120 supplies no measured values within a predetermined period.

If the processing unit 140 has measured value memories 150 to 160, the plausibility window can be more meaningfully determined on the basis of considerations of the stored information. For instance, a degree of change of a measured value over a number of past measurements can enter the formation of the plausibility window. The plausibility window shown in FIG. 4b with the grey background can obtain non-linear legs by the inclusion of further information and/or physical properties of the motor vehicle. In particular, the upper and the lower limit of the plausibility window can develop exponentially away from each other over time, so that the result instead of a triangle is approximately the shape of a trumpet, for instance.

Existing discoveries about the differences of different measured values from each other can influence the measurement frequency. For instance, a sensor of which the measured values are only just in the plausibility window could be monitored more often by plausibility checks. An increase of the testing rate could be achieved by increasing the measurement rate. If varying the measurement frequency of this sensor is impossible or unwanted, the number of measured values per time unit which enter the method could also be varied.

The main motivation for the use of more than one sensor for receiving measured values of a physical variable is the avoidance of automatic interventions into the driving state (e.g. steering interventions) resulting from a faulty sensor. If only two sensors are used in a system, and there are faulty messages from one sensor, it is not always possible to deduce which of the two sensors is still functional. In general, if N sensors are used (N≧2), a malfunction of N−1 sensors can be diagnosed on the basis of the plausibility determination, and if a maximum of N−2 sensors fail, it is also possible to determine with sufficient probability (see above) which sensors have failed. Use of redundant sensors is one of the requirements of IEC 61508 for SIL 3 systems (Safety Integrity Level 3). This applies to AFS systems, for instance. A preferred embodiment of the invention supplies yaw rate data to such an AFS system.

It is often desirable to provide, as well as the plausibility information about a number of redundant sensors, a measured variable signal, which even in the case of a fault is based exclusively on the sensors which are known to be functioning. According to the invention, such a signal is provided by a reference value for the measured variable being determined, and that measured value of a sensor which differs least from the reference signal being output as the output signal 170. Since the measured values of a failed sensor necessarily differ markedly from the reference measured values, which are classified as always plausible, the measured values of failed sensors do not compromise the output signal 170. Switching between the sensors is unnecessary. Since no mean value formation between the measured values of the sensors takes place, errors which are interspersed by a defective sensor are not only mitigated but eliminated by the given method. Temporarily interspersed faults on one of the sensors, such as are frequent in the motor vehicle environment, are compensated for efficiently. If the measured values of a sensor are considered to be plausible again at a later time, the output measured variable signal can again be based on the values which this sensor supplies. The reference values can be supplied by another vehicle component such as an ABS computer, for instance. One of the sensors 110 to 120 which are used can also be specified as the reference sensor.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of checking the plausibility of measured values of at least two sensors for a measured variable in a motor vehicle environment, each sensor supplying measured values of the variable continuously, the method comprising the following steps:
   (a) assigning a time stamp to each measured value $M_i$;
   (b) deriving a plausibility window $P_i$ from physical properties of the motor vehicle;
   (c) testing whether a first measured value $M_1$ supplied by a first sensor and a later second measured value $M_2$ supplied by a second sensor differ by more than is specified by the plausibility window $P_i$, the time interval between a first measured value $M_1$ and the second measured value $M_2$ entering the derivation of the plausibility window $P_i$; and
   (d) depending on a result of the testing, generating a plausibility signal.

2. The method according to claim 1, wherein the measured variable is a yaw rate of the motor vehicle.

3. The method according to claim 2, wherein the physical properties of the motor vehicle include a maximum physically possible yaw rate for the motor vehicle and a maximum yaw rate which can be determined from a steering angle.

4. The method according to claim 1, wherein the testing includes comparing an absolute difference between the first measured value $M_1$ and the second measured value $M_2$ with the plausibility window $P_i$.

5. The method according to claim 1, wherein the plausibility window $P_i$ has an upper and a lower limit, and the two limits are determined independently of each other.

6. The method according to claim 5, wherein a rate of change of the measured values of at least one of the first sensor and the second sensor enters the derivation of the plausibility window $P_i$.

7. The method according to claim 6, wherein information about an operating state of the motor vehicle enters the derivation of the plausibility window $P_i$.

8. The method according to claim 7, wherein a history of at least one of the first and second measured values over a predetermined period is stored, and that this history enters the derivation of the plausibility window $P_i$.

9. The method according to claim 1, wherein the measured values of the at least two sensors are transmitted on a multiplexed bus.

10. The method according to claim 1, wherein if a measured value of at least one of the sensors is absent for a predetermined period, an absent measured value fault signal is output.

11. The method according to claim 1, wherein a measurement frequency of at least one of the first and second sensors depends on a difference of the measured values of this sensor from at least one reference value.

12. The method according to claim 11, wherein additionally measured values which are determined from the measured values the sensors, and are proportional to the measured variable, are determined and output.

13. The method according to claim 11, wherein the measurement frequency depends on a difference of the measured values of the at least one of the first and second sensors from reference values.

14. The method according to claim 1, wherein the measured values of one of the sensors are reference values and further wherein most recent measured values of another sensor, that differs least from the reference values are output.

15. The method according to claim 11, wherein the measured values of one of the sensors are taken as reference values.

16. A device for checking the plausibility of the measured values $M_i$ of at least two sensors for a measured variable in a motor vehicle environment, each sensor supplying measured values of the variable continuously, the device comprising:

at least one input interface for receiving measured values of the at least two sensors, a time stamp being assigned to each measured value $M_i$;

a processing unit which is operable to test whether a first measured value $M_1$ of a first sensor differs from a later second measured value $M_2$ of a second sensor by more than a plausibility window $P_i$ specifies, the plausibility window $P_i$ being derived from a physical properties of a motor vehicle, and with a time interval between the first measured value $M_1$ and the second measured value $M_2$ entering the derivation of the plausibility window $P_i$, the processing unit being further operable, depending on a result of the test, to generate a plausibility signal; and an output interface, via which a plausibility signal is output.

17. The device according to claim 16, wherein the sensors are yaw rate sensors.

18. The device according to claim 16, wherein for each sensor, one of a memory and a memory area is present.

19. The device according to claim 18, wherein the processing unit is a programmable computer.

20. The device according to claim 16, wherein an output signal which is determined from the measured values of the sensors, and which is proportional to the measured variable is also output from the output interface.

21. The device according to claim 20, wherein the measured values of at least two sensors are transmitted to the device via a multiplexed bus.

22. The device according to claim 21, wherein at least one of the output signal and the plausibility signal are transmitted on a multiplexed bus that also carries the measured values of at least one of the sensors.

23. The device according to claim 22, wherein the bus is a serial bus.

24. The device according to claim 16 wherein the processing unit includes a computer program product with program code for carrying out operations of the processing unit when the computer program product runs on the processing unit.

* * * * *

UNITED STATES PATENT AND TRADEMARK OFFICE
CERTIFICATE OF CORRECTION

| | | |
|---|---|---|
| PATENT NO. | : 8,155,909 B2 | Page 1 of 1 |
| APPLICATION NO. | : 12/373598 | |
| DATED | : April 10, 2012 | |
| INVENTOR(S) | : Hubert Schmitt | |

It is certified that error appears in the above-identified patent and that said Letters Patent is hereby corrected as shown below:

Column 11, Claim 11, line 18, replace "this sensor" with --the at least one of the first and second sensors--.

Column 11, Claim 12, line 22, after "values" insert --of--.

Column 11, Claim 13, line 26, replace "this sensor" with --one of the sensors--.

Signed and Sealed this
Fifth Day of June, 2012

David J. Kappos
*Director of the United States Patent and Trademark Office*